United States Patent
Nelson

(10) Patent No.: US 9,661,796 B1
(45) Date of Patent: May 30, 2017

(54) BULB, PLANT, AND SEEDLING DIGGING TOOL

(71) Applicant: Jerry H. Nelson, Mora, MN (US)

(72) Inventor: Jerry H. Nelson, Mora, MN (US)

( * ) Notice: Subject to any disclaimer, the term of this patent is extended or adjusted under 35 U.S.C. 154(b) by 0 days.

(21) Appl. No.: 15/183,737

(22) Filed: Jun. 15, 2016

Related U.S. Application Data

(60) Provisional application No. 62/181,185, filed on Jun. 17, 2015.

(51) Int. Cl.
| | |
|---|---|
| *A01B 1/18* | (2006.01) |
| *A01B 1/02* | (2006.01) |
| *A01B 1/00* | (2006.01) |
| *A01B 1/16* | (2006.01) |
| *A01C 5/02* | (2006.01) |

(52) U.S. Cl.
CPC .............. *A01B 1/022* (2013.01); *A01B 1/00* (2013.01); *A01B 1/024* (2013.01); *A01B 1/16* (2013.01); *A01C 5/02* (2013.01)

(58) Field of Classification Search
CPC .................................................. A01B 1/022
USPC ........... 294/50.5, 50.6, 50.8, 50.9, 51, 50.7; D8/4, 7; 56/400.12; 172/371, 372
See application file for complete search history.

(56) References Cited

U.S. PATENT DOCUMENTS

| | | | |
|---|---|---|---|
| 69,642 A | 10/1867 | Disbrow | |
| 110,211 A | 12/1870 | Davis | |
| 541,841 A | 7/1895 | Doyle | |
| 594,668 A | 11/1897 | Wilkens | |
| 634,902 A * | 10/1899 | Monroe | A01B 1/18 294/50.8 |
| 654,909 A * | 7/1900 | Monroe | A01B 1/18 294/50.9 |
| 772,097 A | 10/1904 | Hayes | |
| 1,187,316 A | 6/1916 | Higby | |
| 2,132,795 A | 10/1938 | Minier | |
| 2,230,498 A * | 2/1941 | Loos | B66C 3/02 294/106 |
| 2,598,288 A * | 5/1952 | Navarre | E21B 11/005 294/50.8 |
| 2,735,712 A * | 2/1956 | Hart | E21B 11/005 294/50.5 |
| 2,740,234 A | 4/1956 | Van Norman | |
| 3,191,982 A | 6/1965 | Goalard | |
| 3,319,988 A | 5/1967 | Smith | |
| 3,460,277 A | 8/1969 | Grover et al. | |

(Continued)

*Primary Examiner* — Paul T Chin
(74) *Attorney, Agent, or Firm* — Albert W. Watkins

(57) ABSTRACT

A digging tool has a pair of handles, each with a hand-grasping portion that provides comfortable manipulation, and each with a lower handle member that couples into a shovel assembly. Each one of the pair of shovel assemblies has a shovel blade and is provided with a suitable foot ledge. Each shovel assembly is formed with the shovel blade on one end, and on a second end distal to the blade a channel encompasses and reinforces a handle contained therein. A pair of plate and fastener combinations cooperate with at least one longitudinally extensive slot in each channel, to allow each shovel assembly to independently reciprocate longitudinally parallel or co-axially with respect to the associated handle. A hinge is provided between and couples each of the two handles together pivotally, preferably relatively more closely to the blade than the hand-grasping portion to provide good mechanical advantage.

14 Claims, 4 Drawing Sheets

(56) References Cited

U.S. PATENT DOCUMENTS

| | | |
|---|---|---|
| 3,713,234 A | 1/1973 | Grover et al. |
| 4,539,920 A | 9/1985 | Dufrene |
| 5,156,101 A | 10/1992 | Wien |
| 5,456,449 A | 10/1995 | Smith |
| 5,485,691 A | 1/1996 | Stevens et al. |
| 7,819,447 B1 | 10/2010 | Ange |
| D657,640 S * | 4/2012 | Mikel ............................. D8/4 |

* cited by examiner

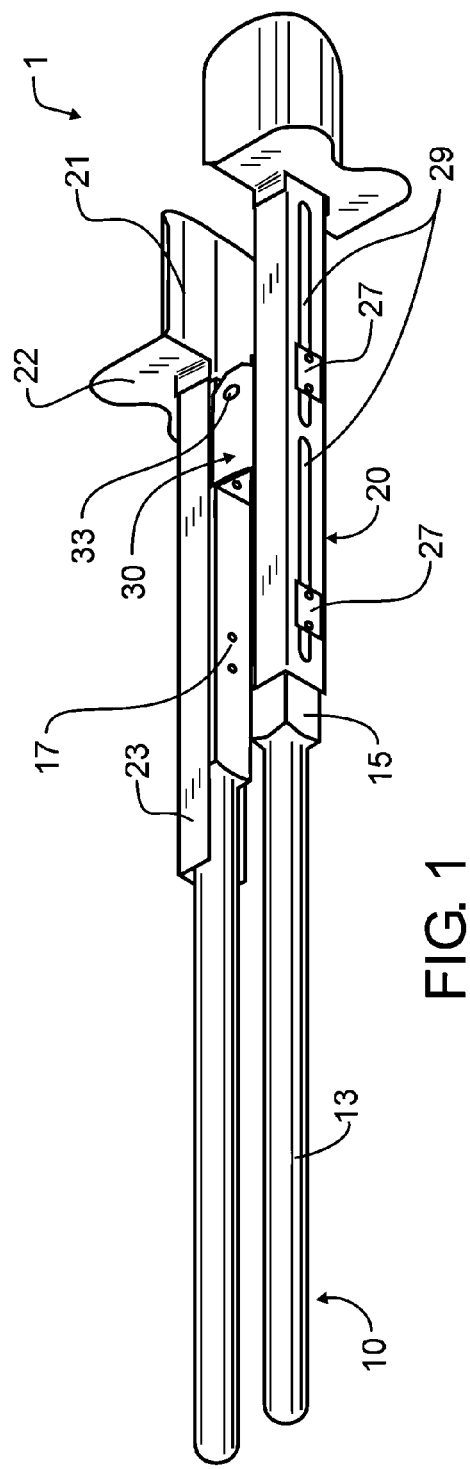
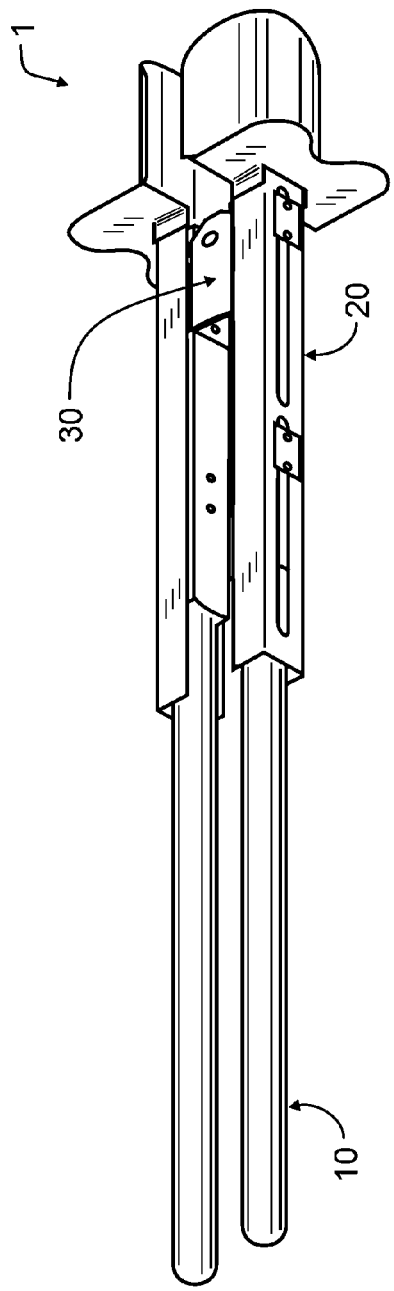

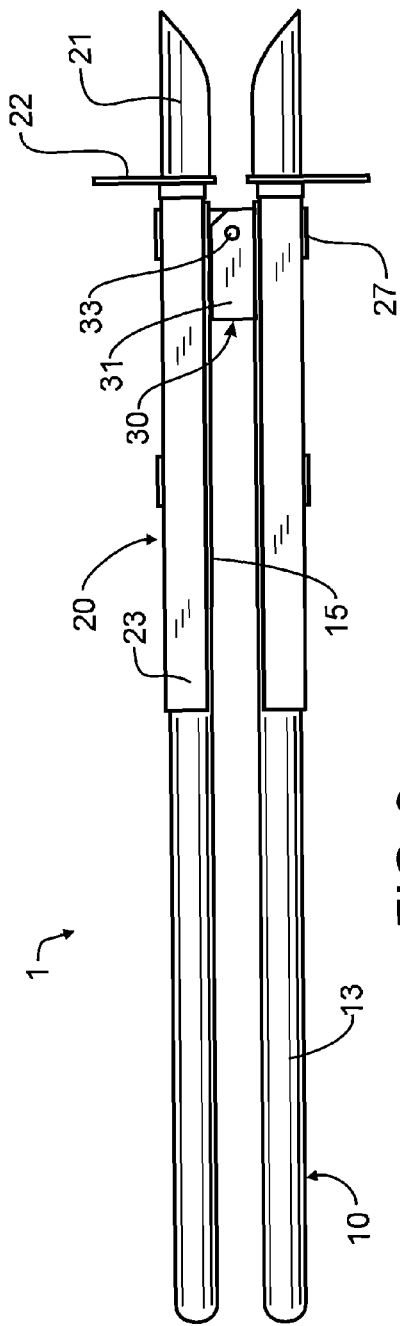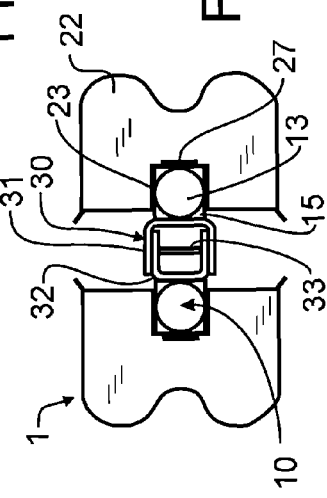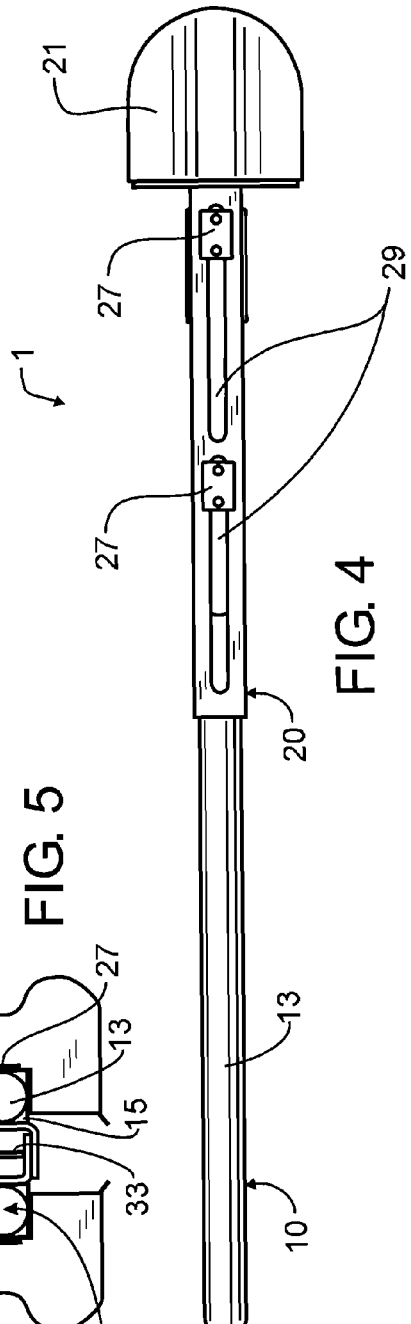

BULB, PLANT, AND SEEDLING DIGGING TOOL

CROSS REFERENCE TO RELATED APPLICATIONS

The present application claims the benefit of U.S. provisional patent application 62/181,185 filed Jun. 17, 2016 of like title and inventorship, the teachings and entire contents which are incorporated herein by reference.

BACKGROUND OF THE INVENTION

1. Field of the Invention

This invention pertains generally to tools and implements for agriculture and horticulture, and more particularly to a hand tool having jaws activated by relatively movable plural handles that facilitates the planting and removal of bulbs, plants, and seedlings.

2. Description of the Related Art

Most gardeners and landscapers plant a wide variety of plants, flowers, trees, and shrubs. The most common tools used are simple shovels of varying size. A typical procedure might be to use a spade or the like to create a hole in the ground. Unfortunately, a simple spade does not prepare a clean or consistently sized hole, and will also most commonly require careful lifting and scraping to remove soil from the earth. This process will also most commonly require the gardener to kneel on the ground and use a smaller hand trowel, shovel, or spade, to lift and scrape the soil and shape the hole. While this procedure is quite effective and does not require a significant amount of time or effort to prepare the earth for a single plant, the opposite is true when many plants are to be placed into the earth. For exemplary purposes, when a person is preparing a large number of bulbs in the spring, or removing a large number of bulbs in the fall, this process can be extremely laborious and particularly difficult owing to the need to kneel on the ground and then stand back up repeatedly. While gardening is thought of as an enjoyable and relaxing past time beneficial to one's physical and mental health and well-being, this need to repeatedly kneel and stand is simply not possible for some persons, and in other persons defeats the enjoyment, causing many to not pursue this type of gardening at all. Consequently, there has been a long felt need for an improved tool to facilitate the planting and removal of various bulbs, plants, and seedlings from the earth.

A number of artisans have devised very creative and beneficial tools that greatly facilitate the planting and removal of plants from the soil. One approach has been to provide a relatively smaller hand-held apparatus. Exemplary patents, the teachings and contents which are incorporated herein by reference, include: U.S. Pat. No. 69,642 by Disbrow, entitled "Transplanter"; U.S. Pat. No. 2,740,234 by Van Norman, entitled "Transplanter"; U.S. Pat. No. 3,319,988 by Smith, entitled "Apparatus for manually digging out sods of turf"; U.S. Pat. No. 3,460,277 by Grover et al, entitled "Transplanter"; and U.S. Pat. No. 5,156,101 by Wien, entitled "Tree transplanter". These patents illustrate several common concepts. A plurality of blades are provided that are independently operable, and these blades penetrate the earth at various angles designed to converge towards a sharp point at or well beyond the bottom end of travel. In either case, the shape of the portion of soil that is worked upon is that of a frustum of a cone or pyramid, or, in the case of Grover et al, that of a cone. These types of tools provide a clean and rapid way of retrieving a plant from the earth, and forming a place in the earth to receive a plant removed using the tool. As useful as these tools are, there are several less-than-desirable features.

One of these less-than-desirable features is the open bottom, the size of which must be varied depending upon the soil type. In other words, in loose and sandy soil, any opening on the bottom will lead to the soil simply running out of the open bottom. For working with such loose soil, relatively longer blades are necessary that are oriented at an angle more nearly parallel to the ground and which meet in the center to define a full cone or pyramid. However, the extra weight and cost of the extra blade material is generally undesirable, unless required by loose soil. In contrast, the longer and more nearly horizontal blades are not required in more sticky soils such as common with higher clay content and sometimes in higher organic content soils. The extra blade surface area not only adds cost and weight, but in these types of soil can also make the blades harder to pierce the earth with. Instead, in such heavier soils, a geometry such as illustrated by Disbrow may be preferred.

Another sometimes beneficial and other times less-than-desirable feature is the frustum shape itself, which is consistently formed at a particular depth. When a single consistent planting depth is desired, this is beneficial. The tool operator will simply press the blades in to their limit, as they are designed, which will form the frustum enclosure. However, this also restricts the ability of a person to readily set or change the planting depth of the plant. In other words, whatever depth the tool is designed for will be the depth the tool operates at. Attempting to form a shallower opening in the earth will leave large gaps between adjacent walls of the frustum, which will allow soil to slip there between. Once again the amount of soil that will escape in these gaps will be variable dependent upon the soil type, but particularly in loose soils such as predominant sand, the blades must be fully inserted or the loose soil will simply fall out as the tool is being removed from the earth.

Yet another less-than-desirable feature is the number of separable parts, making it somewhat more clumsy to store, transport, and use the tool than would be most preferred. In the worst case, if the separable parts are separated unknowingly, such as during a rearrangement of a storage shed or garage for either winter or spring, the entire tool will be disabled until all parts are located.

In some of these patents, a person will also undesirably have to bend over to place or operate the components. This can be challenging for some gardeners.

A number of patents illustrate even larger versions of these frustum, conical, pyramidal, or even hemispherical arrangements. Exemplary patents, the teachings and contents which are incorporated herein by reference, include: U.S. Pat. No. 594,668 by Wilkens, entitled "Tree transplanter"; U.S. Pat. No. 3,191,982 by Goalard, entitled "Apparatus for transplanting plants or trees"; U.S. Pat. No. 3,713,234 by Grover et al, entitled "Transplanter with stress compensating blade guide means"; and U.S. Pat. No. 5,485,691 by Stevens et al, entitled "Apparatus for excavating and transplanting trees and the like and method of use". While these types of apparatus are extremely useful for digging and moving larger plants such as large bushes and trees, they have no utility for a homeowner or gardener working with bulbs, small plants, and seedlings.

Several particularly creative and skilled artisans have addressed more of the limitations of the frustum tools. Exemplary patents, the teachings and contents which are incorporated herein by reference, include: U.S. Pat. No. 110,211 by Davis, entitled "Transplanter"; U.S. Pat. No.

541,841 by Doyle, entitled "Transplanter"; U.S. Pat. No. 4,539,920 by DuFrene, entitled "Transplanters"; and U.S. Pat. No. 5,456,449 by Smith, entitled "Weed removal tool". All of these tools are entirely contained as a single tool, with no separable parts. Doyle and Smith each require both blades to be inserted simultaneously into the earth, while the Davis and DuFrene tools each illustrate tools that may be pressed into the earth one blade at a time, allowing a person with less total force to do a better job driving the blades in. Unfortunately, the Davis and DuFrene tools suffer from the same limitations as the frustum patents described herein above. The gap between opposed blades must be determined by the soil type, making these tools less than optimum for working with the wide variety of soil types that different homeowners and gardeners may encounter. Further, the Smith patent is also somewhat inconvenient, since the design requires proper orientation for a person to use a preferred foot. In other words, most operators of the Smith tool will quickly realize that they have to orient the tool to suit their preferred "handedness", which herein will be understood to mean a preference for stepping onto the foot engaging surface with only one of either their right foot or left foot.

Other somewhat less relevant patents, which nevertheless provide further examples of the general skill in this industry, the teachings and contents which are incorporated herein by reference, include: U.S. Pat. No. 772,097 by Hayes, entitled "Beet topper and lifter"; U.S. Pat. No. 1,187,316 by Higby, entitled "Post hole digger"; U.S. Pat. No. 2,132,795 by Minier, entitled "Culvert cleaner and post hole digger"; and U.S. Pat. No. 7,819,447 by Ange, entitled "Hand actuated soil displacement and planting device".

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a bulb, plant, and seedling digging tool. A handle assembly comprises first and second handles each having a longitudinal axis defining a length. First and second shovel assemblies are opposed relative to each other and each are configured to penetrate into soil. Each of the first and second shovel assemblies have a longitudinal axis defining a length. The first shovel assembly is adapted to reciprocate relative to the first handle on an axis generally parallel to the first handle longitudinal axis. The second shovel assembly is adapted to reciprocate relative to the second handle on an axis generally parallel to the second handle longitudinal axis. A hinge is secured to the first handle assembly intermediate between the first handle and the first shovel assembly and is secured to the second handle assembly intermediate between the second handle and the second shovel assembly. The hinge is pivotal about an axis transverse to the first and second handle longitudinal axes to thereby vary a volume between the first and second shovel assemblies.

In a second manifestation, the invention is a bulb, plant, and seedling digging tool. A handle assembly comprises first and second handles each having a longitudinal axis defining a length. First and second shovel assemblies are opposed relative to each other and each are configured to penetrate into soil. Each of the first and second shovel assemblies have a shovel blade and a channel forming a longitudinal axis defining a length. The first shovel assembly is adapted to reciprocate relative to the first handle coaxial to the first handle longitudinal axis and thereby define a linear bearing there between. The said second shovel assembly is adapted to reciprocate relative to the second handle coaxial to the second handle longitudinal axis and thereby define a linear bearing there between. A hinge is secured to the first handle assembly intermediate between the first handle and the first shovel assembly and is secured to the second handle assembly intermediate between the second handle and the second shovel assembly. The hinge is pivotal about an axis transverse to the first and second handle longitudinal axes to thereby vary a volume between the first and second shovel assemblies.

OBJECTS OF THE INVENTION

Exemplary embodiments of the present invention solve inadequacies of the prior art by providing a digging tool having a pair of longitudinally extensive handles dimensioned with sufficient length to allow a person to operate the assembly entirely while standing in an upright or erect position. A pair of generally cylindrical hand-grasping portions provide comfortable manipulation, while a lower handle member couples into a shovel assembly. Each one of a pair of shovel blades is provided with a suitable foot ledge. The shovel assembly is formed with the shovel blade on one end, and on a second end distal to the blade is provided a channel that encompasses and provides reinforcement to a handle contained therein. A pair of plate and fastener combinations cooperate with longitudinally extensive slots in each channel, to allow each shovel assembly to reciprocate longitudinally parallel or co-axially with respect to the associated handle. A hinge is provided between the two handles that couples each of the two handles together pivotally, preferably relatively more closely to the blade than the hand-grasping portion, to provide good mechanical advantage.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a digging tool that better facilitates the digging and planting of bulbs, smaller plants, and seedlings. A second object of the invention is for the tool to be operable entirely from an upright position standing erect. Another object of the present invention is for the tool to function well in all soil types, with sufficient mechanical advantage to enable effective operation by a person with limited arm strength. A further object of the invention is to enable operation of the tool independent of orientation and "handedness", by enabling either blade to be pressed into the ground independently of the other, and each by a foot ledge. Yet another object of the present invention is for the geometry of the tool to be conducive to a person being able to selectively control the depth of planting or transplanting. An additional object of the invention is for the tool to be intuitive to use and relatively light weight, to permit people of a wide range of physical sizes, strength, and agility to use the tool as possible. Another object of the invention is to fabricate the tool from a minimum of both total and distinct parts, preferably using a common and relatively low cost operation, to simplify manufacturing, maintenance, and reliability, all while lowering manufactured cost to permit the tool to be purchased by a wider range of persons. A further object of the invention is for the tool to be self-contained as a single assembly, with no parts ordinarily removed during use or storage.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIGS. 1 and 2 illustrate a preferred embodiment bulb, plant, and seedling digging tool designed in accord with the teachings of the present invention from projected view, illustrating the tool with one shovel assembly in a first intermediate position in FIG. 1, and either a storage or second intermediate position in FIG. 2.

FIGS. 3-5 illustrate the preferred embodiment bulb, plant, and seedling digging tool of FIG. 2 from front, side and top views, respectively.

DESCRIPTION OF THE PREFERRED EMBODIMENT

Figure 6:
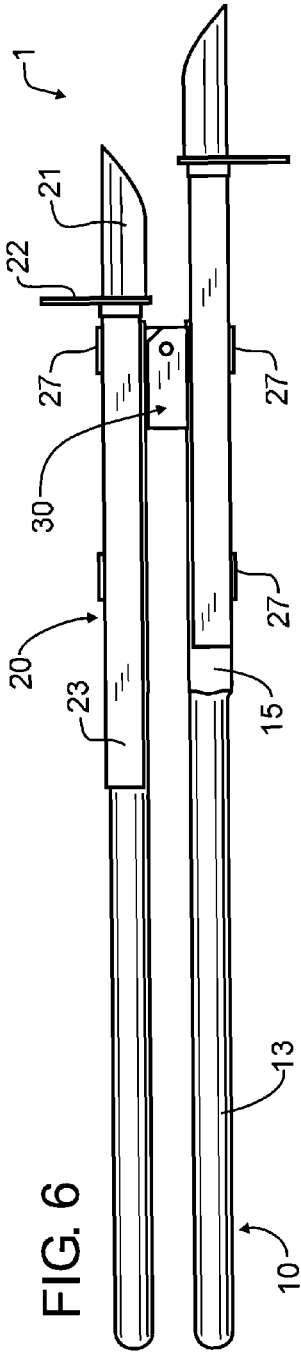
FIGS. 6-8 illustrate the preferred embodiment bulb, plant, and seedling digging tool of FIG. 1 from front, side and back views, respectively.
Figure 7:
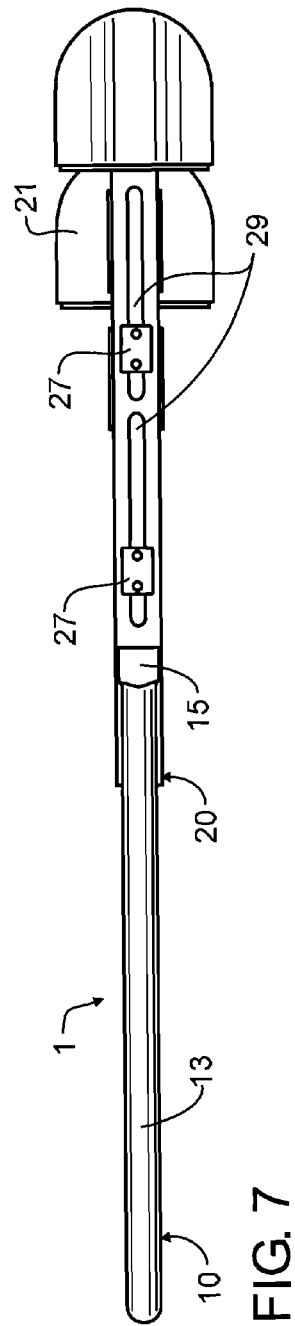
Figure 8:
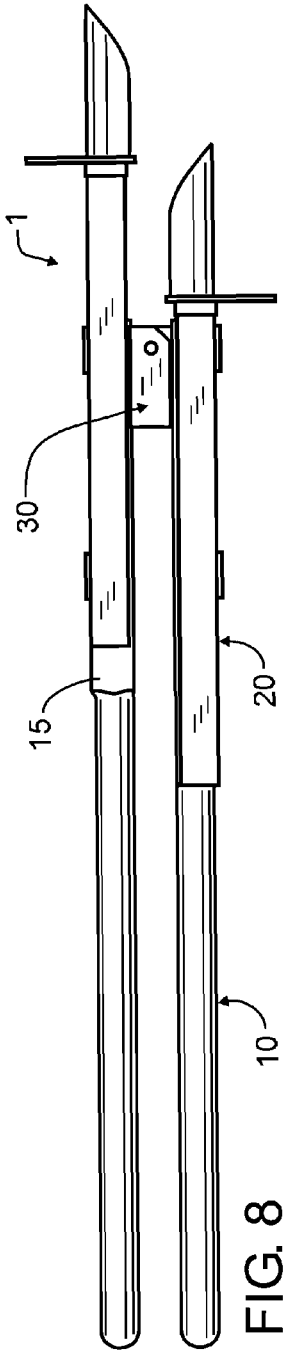

Manifested in a preferred embodiment, the present invention provides a bulb, plant, and seedling digging tool that is intuitive to use, relatively light weight, and may be operated by a person with limited arm strength entirely from an upright position. In a preferred embodiment of the invention illustrated in the Figures, a bulb, plant, and seedling digging tool 1 is comprised of a handle assembly 10, a shovel assembly 20, and a hinge 30. Handle assembly 10 may for exemplary and non-limiting purposes comprise a common wooden handle commercially sold for a variety of purposes, having a generally cylindrical hand-grasping portion 13, and a rectangular lower handle member 15 distal to hand-grasping portion 13. A preferred handle material may for exemplary purposes only, and not solely limiting the invention thereto, be selected from hollow or solid compositions of wood, metals, plastics with or without reinforcing fiber and including fiberglass and similar composites, or other similar or equivalent materials.

Rectangular lower handle member 15 is most preferably configured to provide a linear bearing surface for a U-shaped channel 23 to slide upon. Keeping U-shaped channel 23 adjacent to lower handle member 15 are a pair of plate and fastener combinations 27. The plates may be of any suitable geometry, but as illustrated are rectangular and relatively thin. The fasteners, for exemplary and non-limiting purposes only, might comprise a combination bolt and cap nut, Nylok™ nut, or the equivalent. The fasteners may then be secured in place without rigidly coupling U-shaped channel 23 to lower handle member 15, and instead will allow movement there between. When bolts are used, they may pass through holes 17 formed into handle assembly 10. Longitudinally extensive slots 29 are formed in U-shaped channels 23, allowing U-shaped channels 23 to slide along lower handle members 15 until, at either end of travel, the fasteners of plate and fastener combinations 27 will engage with and be stopped from further travel by the ends of the slots 29 in U-shaped channel 23.

It will be understood that while U-shaped channel 23 is configured to slide upon a rectangular lower handle member 15, any suitable geometry or construction may be used for rectangular lower handle member 15, U-shaped channel 23, and the linear bearing as is known in the mechanical arts. In one exemplary but non-limiting alternative embodiment, lower handle member 15 might be round, and in such case channel 23 would have a semi-circular cross-section, rather than a "U" shape. Consideration of the construction of lower handle member 15, channel 23, and linear bearing must be made for the exposure of preferred embodiment digging tool 1 to dirt, sand, water, and other contaminants, and to the ultimate cost of the finished tool. Furthermore, in preferred embodiment bulb, plant, and seedling digging tool 1, the rectangular geometry of lower handle member 15 has benefit in providing not only strength and bearing contact with channel 23, but also with a hinge 30, as will be described next.

At the end of each channel 23 distal to hand-grasping portion 13 is a shovel blade 21, and at the intersection between channel 23 and shovel blade 21 is a foot ledge 22. Since each channel 23 carries a foot ledge 22, a person does not have to specifically orient preferred embodiment bulb, plant, and seedling digging tool 1. From either direction, a person may step on whichever foot ledge 22 is more natural.

Since shovel assembly 20 is operative to slide longitudinally along lower handle member 15, then stepping on either foot ledge 22 will drive the single associated shovel blade 21 into the ground. This means that a person need only generate enough force to drive one shovel blade 21 into the ground at a time, allowing the person to do a better job penetrating the earth with less force than would be required to drive both shovel blades 21 in.

Affixed solely to lower handle members 15 is a hinge 30 that allows the two handles 10 to pivot relative to each other about an axis transverse thereto. Hinge 30 may be any suitable structure that allows the pair of handle assemblies 10 to pivot with respect to each other. In the preferred embodiment bulb, plant, and seedling digging tool 1, this is accomplished through the provision of a smaller U-shaped channel hinge member 32 that nests inside of a larger U-shaped channel hinge member 31. A pintle 33 of any suitable construction couples U-shaped channel hinge members 31, 32 together in a pivotal manner.

The provision of U-shaped channel hinge members 31, 32 allows these channels to run longitudinally co-extensive with each respective lower handle member 15. This provides several benefits. First, U-shaped channel hinge members 31, 32 may share holes 17 and the fasteners used in plate and fastener combinations 27 to couple securely to each respective lower handle member 15. In addition, the length of U-shaped channel hinge members 31, 32 co-extensive with each respective lower handle member 15 also provides better resistance to greater torque that might be applied by a particularly strong gardener, distributing that force over a long portion of each respective lower handle member 15. U-shaped channel hinge members 31, 32 may be readily stamped from metal sheet or roll stock, making the fabrication thereof relatively inexpensive, while providing great strength, simplicity, and resistance to dirt and contaminants.

The use of U-shaped channel hinge members 31, 32 also simplifies the construction of pintle 33, which in the preferred embodiment may for exemplary purposes comprise a simple bolt and locking nut combination, or a pinned shaft. Once again, a wide variety of pintle structures are known in the hardware arts that would substitute herein, and those known pintles suitable for implementation herein are considered to be incorporated in alternative embodiments.

To use the preferred embodiment bulb, plant, and seedling digging tool 1, a person will set the shovel assemblies 20 onto the ground, and allow handles 10 to fully slide down towards the ground, again into the position depicted in FIGS. 2-4, with both shovel assemblies 20 in side-by-side relationship. Next, the person will step upon a first one of the two foot ledges 22, preferably driving shovel blade 21 fully into the earth. Then the person will step upon the second of the two foot ledges 22, also driving it into the earth parallel to but spaced from the first shovel blade. Then the person may spread apart the two hand-grasping portions 13, which causes the two handles 10 to pivot about hinge 30. This in turn causes the two shovel blades 21 to come together at their extreme tips, compacting and capturing the earth there between. Finally, the person will then be able to lift the entire preferred embodiment bulb, plant, and seedling digging tool 1 from the earth, bringing with any earth and plant matter that is captured therein.

If hinge 30 is located more nearly adjacent to shovel blades 21 than to hand-grasping portions 13, a person will gain mechanical advantage due to the force multiplication inherent therein. In other words, if the distance from the hand-grasping portions 13 to hinge 30 is three times as great as the distance between hinge 30 and shovel blades 21, then a force of ten pounds on hand-grasping portions 13 will be converted to a force of thirty pounds on shovel blade 21. As illustrated, preferred embodiment bulb, plant, and seedling digging tool 1 in fact has hinge 30 even closer yet, meaning that even a meager person may be able to generate substantial force between opposed shovel blades 21, to securely retain earth therein. This greater force acts directly upon the soil captured between opposed shovel blades 21, tightly holding soil of nearly all arable types.

As may be appreciated by gardeners and landscapers alike, in early season preferred embodiment bulb, plant, and seedling digging tool 1 will greatly facilitate the formation of consistent cylindrical holes in the earth, into which various bulbs, plants, and seedlings may be inserted at any desired depth. In the case of bulbs or the seasonal transplanting of plants that occurs in many nurseries, this same preferred embodiment bulb, plant, and seedling digging tool 1 may then be used to remove the bulbs, plants, and seedlings from the earth, either for winter storage or for appropriate transplanting.

The ability for each shovel assembly 20 to slide independently of the other along each handle assembly, and thereby be driven independently into the earth, greatly facilitates the penetration into the earth. Likewise, and as already noted herein above, since each channel 23 carries a foot ledge 22, a person does not have to specifically orient preferred embodiment bulb, plant, and seedling digging tool 1. From either direction, a person may step on whichever foot ledge 22 is more natural. Consequently, the preferred embodiment bulb, plant, and seedling digging tool 1 may be used by gardeners and landscapers of nearly all sizes, strengths, and "handedness".

While less preferable, it will also be understood that while a pair of sliding shovel assemblies 20 are illustrated, it is also contemplated that one of the assemblies may alternatively be fixed relative to the associated handle assembly, leaving only one shovel assembly to slide. In this case, a person would preferably step first upon the fixed shovel assembly, driving it into the earth. The sliding assembly will simply shift to the fully retracted position while the fixed shovel assembly is driven into the earth. Next, a person would then step upon the sliding shovel assembly 20, driving it into the earth. From there, operation is the same as with the preferred embodiment bulb, plant, and seedling digging tool 1 already described herein above.

From the foregoing figures and description, several additional features and options become more apparent. First of all, preferred embodiment bulb, plant, and seedling digging tool 1 may be manufactured from a variety of materials, including metals, resins and plastics, ceramics or cementitious materials, or even combinations or composites of the above. The specific material used may vary, though special benefits are attainable if several important factors are taken into consideration. First, shovel assembly 20 preferably will be durable enough to withstand repeated use in unpredictable soil that may include sand, gravel, tree roots, or rocks. By using steel or similar material, the shovel assembly may be very durable, while preserving great strength for a given weight. Furthermore, in the preferred embodiment bulb, plant, and seedling digging tool 1, shovel assembly 20 is designed from a geometry that allows U-shaped channel 23 and shovel blade 21 to be formed integrally through a simple metal stamping operation. Handle assembly 10 will preferably comprise a lighter weight but still strong material. In the case of partially resilient materials, there is a dampening of energy in the event a hard object such as a rock is encountered. Furthermore, it is preferable that all materials are sufficiently tough and durable to not fracture, even when great forces are applied thereto.

In preferred embodiment bulb, plant, and seedling digging tool 1, special consideration has been given to a potential weak point, which is adjacent to the top of shovel blade 21, within U-shaped channel 23. Particularly when driving shovel blade 21 into the earth, or when separating hand-grasping handle portions 13 to remove earth, there may be substantial force within U-shaped channel 23 between hinge 30 and foot ledge 22.

Figure 9:
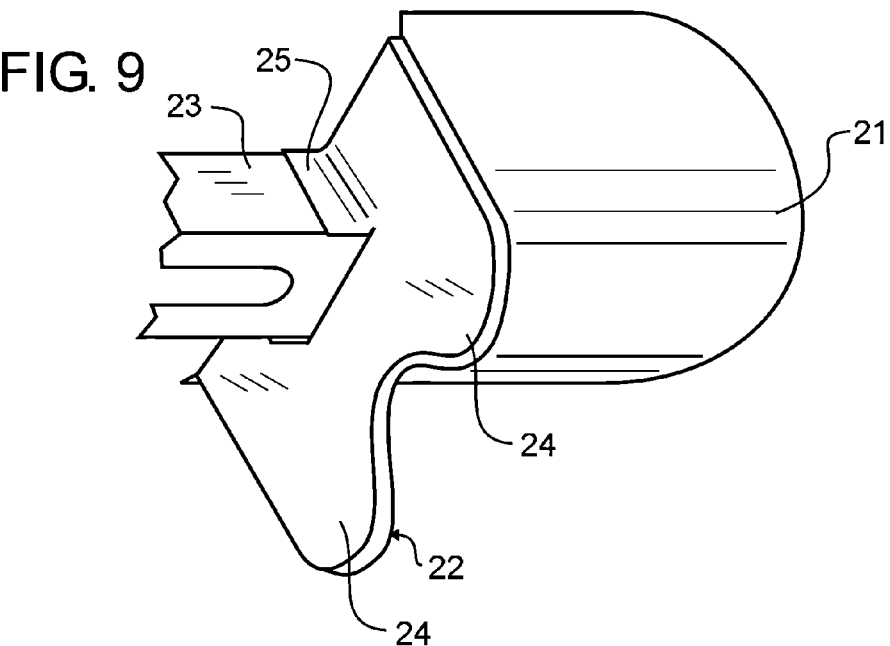
FIGS. 9-11 illustrate the preferred embodiment coupling between shovel blade and foot ledge by projected, side, and bottom views, respectively.
Figure 10:
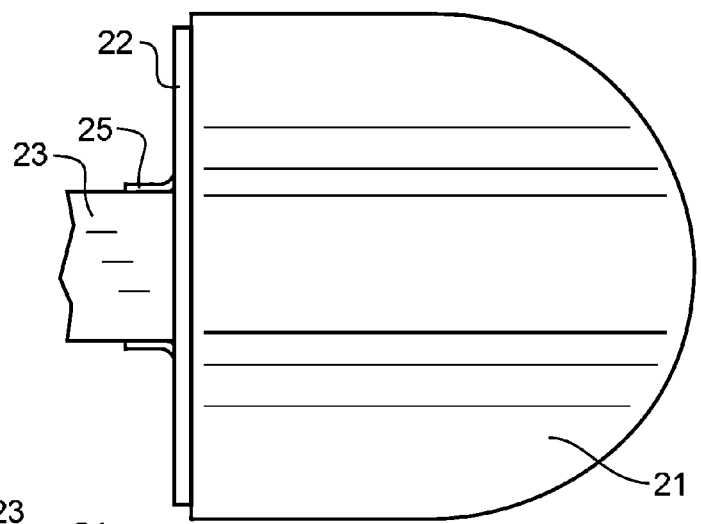
Figure 11:
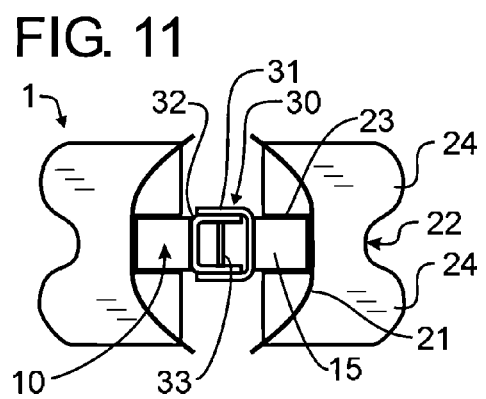

In the preferred embodiment bulb, plant, and seedling digging tool 1, U-shaped channel 23 and shovel blade 21 are formed from a single sheet of metal through stamping. As shown in FIG. 9, foot ledge 22 has been fabricated from a plate or sheet, which may be shaped decoratively or functionally to include ears 24. In addition, a pair of tabs 25 are formed by severing along a pair of lines and bending the tab metal into a position normal or perpendicular to the major planar surface of foot ledge 22. These tabs 25 may then be welded to U-shaped channel 23, thereby securing foot ledge 22 to U-shaped channel 23. In addition, tabs 25 may form a small region of reinforcement that has extra thickness and therefore extra strength. In an alternative embodiment, U-shaped channel 23 may simply be of heavier material, or additional material may be added as reinforcement within this region. Nevertheless, the longitudinal extension of U-shaped channels 23 and hinge members 31, 32 parallel with lower handle member 15 provides increased durability and resistance to failure.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:
1. A bulb, plant, and seedling digging tool, comprising:
a handle assembly comprising first and second handles each having a longitudinal axis defining a length;

first and second shovel assemblies opposed relative to each other and each configured to penetrate into soil, each of said first and second shovel assemblies having a longitudinal axis defining a length, said first shovel assembly adapted to reciprocate relative to said first handle on an axis generally parallel to said first handle longitudinal axis and said second shovel assembly adapted to reciprocate relative to said second handle on an axis generally parallel to said second handle longitudinal axis; and a hinge secured to said first handle assembly intermediate between said first handle and said first shovel assembly and secured to said second handle assembly intermediate between said second handle and said second shovel assembly, said hinge pivotal about an axis transverse to said first and second handle longitudinal axes to thereby vary a volume between said first and second shovel assemblies;

wherein said first shovel assembly further comprises a shovel blade, a channel and a longitudinally extensive slot having a plate and fastener, said fastener passing through said handle and said slot, said slot and fastener in combination acting as a limit to an extent of said reciprocation.

2. The bulb, plant, and seedling digging tool of claim 1, wherein said shovel assembly and said handle in combination further comprise a linear bearing.

3. The bulb, plant, and seedling digging tool of claim 1, wherein said first shovel assembly is adapted to reciprocate coaxially with said first handle longitudinal axis and said second shovel assembly is adapted to reciprocate coaxially with said second handle longitudinal axis.

4. The bulb, plant, and seedling digging tool of claim 1, wherein said channel further comprises a U-shaped cross-section.

5. The bulb, plant, and seedling digging tool of claim 1, wherein said shovel blade and said channel are unitary.

6. The bulb, plant, and seedling digging tool of claim 1, wherein said first shovel assembly further comprises a foot ledge.

7. The bulb, plant, and seedling digging tool of claim 1, wherein said hinge further comprises:
a larger channel hinge member;
a smaller channel hinge member nested within said larger channel hinge member; and
a pintle coupling said larger channel hinge member to said smaller channel hinge member.

8. The bulb, plant, and seedling digging tool of claim 7, wherein said larger channel hinge member further comprises a U-shaped cross-section.

9. A bulb, plant, and seedling digging tool, comprising:
a handle assembly comprising first and second handles each having a longitudinal axis defining a length;

first and second shovel assemblies opposed relative to each other and each configured to penetrate into soil, each of said first and second shovel assemblies having a shovel blade and a channel forming a longitudinal axis defining a length, said first shovel assembly adapted to reciprocate relative to said first handle coaxial to said first handle longitudinal axis and thereby define a linear bearing therebetween and said second shovel assembly adapted to reciprocate relative to said second handle coaxial to said second handle longitudinal axis and thereby define a linear bearing therebetween; and a hinge secured to said first handle assembly intermediate between said first handle and said first shovel assembly and secured to said second handle assembly intermediate between said second handle and said second shovel assembly, said hinge pivotal about an axis transverse to said first and second handle longitudinal axes to thereby vary a volume between said first and second shovel assemblies;

wherein said first shovel assembly further comprises a longitudinally extensive slot having a plate and fastener, said fastener passing through said handle and said slot, said slot and fastener in combination acting as a limit to an extent of said reciprocation.

10. The bulb, plant, and seedling digging tool of claim 9, wherein said channel further comprises a U-shaped cross-section.

11. The bulb, plant, and seedling digging tool of claim 9, wherein said shovel blade and said channel are unitary.

12. The bulb, plant, and seedling digging tool of claim 9, wherein said first shovel assembly further comprises a foot ledge.

13. The bulb, plant, and seedling digging tool of claim 9, wherein said hinge further comprises:
a larger channel hinge member;
a smaller channel hinge member nested within said larger channel hinge member; and
a pintle coupling said larger channel hinge member to said smaller channel hinge member.

14. The bulb, plant, and seedling digging tool of claim 13, wherein said larger channel hinge member further comprises a U-shaped cross-section.

* * * * *